UNITED STATES PATENT OFFICE.

WILLIAM A. TUCKER, OF TERRE HAUTE, INDIANA, ASSIGNOR OF ONE-HALF TO WILLIAM R. ADAMS, OF CLARKSHILL, INDIANA.

MOISTURE-PROOF COATING FOR BRICK OR STONE.

SPECIFICATION forming part of Letters Patent No. 705,625, dated July 29, 1902.

Application filed April 7, 1902. Serial No. 101,805. (No specimens.)

*To all whom it may concern:*

Be it known that I, WILLIAM A. TUCKER, a citizen of the United States, residing at Terre Haute, in the county of Vigo and State of Indiana, have invented certain new and useful Improvements in Moisture-Proof Coatings for Brick or Stone, of which the following is a specification.

A considerable quantity of building-brick has incorporated therein an alkaline salt which when the brick is exposed to moisture gradually works out, so as to form white spots on the face of the brick, thus materially disfiguring a building composed of such brick.

The object of my invention is therefore to produce a coating the main body of which is colorless which may be applied to brick or stone either before or after the same has been incorporated in a building and of such a character as to be moisture-proof.

My compound is in the nature of a varnish or paint and is compounded in the following manner and of the following ingredients: One part of beeswax and three parts of paraffin are melted together. This mixture is allowed to cool to a point where the admixture of the other ingredients will not cause ignition, and I then add three parts of Venice turpentine, one part of dissolved glue, (preferably strong hoof-glue,) one part of raw linseed-oil, and three parts of coal-oil, the whole being thoroughly mixed. When a coating is to be applied to stone or brick, a sufficient amount of drier, such as benzin, is thoroughly mixed into the mass and the varnish thus produced applied with a brush or, if desired, by dipping the stone or brick into the liquid.

The compound described is practically colorless and transparent and produces a coating which is absolutely moisture-proof. As a consequence brick treated with a coating of this material will remain spotless even though highly impregnated with alkaline salts. If a colored coating is desired, the same may be produced by the addition of any suitable coloring ingredient, either in the form of a dry powder or in the form of a colored paint.

I claim as my invention—

A moisture-proof coating for brick and stone consisting of beeswax, paraffin, Venice turpentine, glue, linseed-oil, and coal-oil, substantially in the proportions specified.

In witness whereof I have hereunto set my hand and seal, at Indianapolis, Indiana, this 2d day of April, A. D. 1902.

WILLIAM A. TUCKER. [L. S.]

Witnesses:
    ARTHUR M. HOOD,
    WILLIAM R. ADAMS.